US012086019B2

(12) United States Patent
Bivans

(10) Patent No.: US 12,086,019 B2
(45) Date of Patent: Sep. 10, 2024

(54) METHOD FOR DECREASING PROBABILITY OF UNDETECTED ERRORS ON LARGE MESSAGES OVER A BLACK CHANNEL

(71) Applicant: Fort Robotics, Inc., Philadelphia, PA (US)

(72) Inventor: Nathan Bivans, Philadelphia, PA (US)

(73) Assignee: Fort Robotics, Inc., Phladelphia (PA)

( * ) Notice: Subject to any disclaimer, the term of this patent is extended or adjusted under 35 U.S.C. 154(b) by 0 days.

(21) Appl. No.: 18/367,840

(22) Filed: Sep. 13, 2023

(65) Prior Publication Data

US 2024/0086268 A1    Mar. 14, 2024

Related U.S. Application Data

(60) Provisional application No. 63/406,130, filed on Sep. 13, 2022.

(51) Int. Cl.
*G06F 11/07* (2006.01)

(52) U.S. Cl.
CPC .................. *G06F 11/076* (2013.01)

(58) Field of Classification Search
CPC .................................................. G06F 11/076
See application file for complete search history.

(56) References Cited

U.S. PATENT DOCUMENTS

| 5,974,529 | A | 10/1999 | Zumkehr et al. |
| 7,555,677 | B1 * | 6/2009 | Wiley ................. G06F 11/2284 |
| | | | 714/36 |
| 8,527,760 | B2 | 9/2013 | Faiman et al. |
| 8,589,760 | B1 * | 11/2013 | Kou .................... H03M 13/1102 |
| | | | 714/763 |
| 8,874,818 | B2 | 10/2014 | Felth et al. |
| 10,338,984 | B2 * | 7/2019 | Fujinami ................ G11C 29/00 |

(Continued)

FOREIGN PATENT DOCUMENTS

| JP | 2007528160 A | 10/2007 |
| JP | 2010088120 A | 4/2010 |

(Continued)

OTHER PUBLICATIONS

U.S. Appl. No. 17/332,635, filed May 27, 2021, Kerfegar Khurshed Katrak.

(Continued)

*Primary Examiner* — Guy J Lamarre
(74) *Attorney, Agent, or Firm* — Run8 Patent Group, LLC; Peter Miller; Brian T. Chew

(57) ABSTRACT

A method includes: receiving a message, via a communication link, including sensor data in a data stream from a sensor device and first reference data based on a deterministic function and a seed value; extracting the first reference data from the message; generating second reference data based on the deterministic function and the seed value; calculating a first quantity of bit errors in the first reference data based on the second reference data; calculating a bit error rate of the communication link based on the first quantity of bit errors; in response to the bit error rate exceeding a bit error rate threshold for the data stream, generating a second message representing a fault; and transmitting the second message to a second device.

15 Claims, 5 Drawing Sheets

(56) References Cited

U.S. PATENT DOCUMENTS

| | | | |
|---|---|---|---|
| 10,372,551 B2* | 8/2019 | Milton | G06F 11/076 |
| 11,086,336 B1 | 8/2021 | Bolotski et al. | |
| 11,127,295 B2 | 9/2021 | Radha et al. | |
| 11,372,796 B2 | 6/2022 | Culca et al. | |
| 11,455,223 B2 | 9/2022 | Nagy et al. | |
| 2004/0008467 A1 | 1/2004 | Calandre et al. | |
| 2004/0015691 A1 | 1/2004 | Collette et al. | |
| 2004/0078116 A1 | 4/2004 | Hashimoto et al. | |
| 2004/0153786 A1 | 8/2004 | Johnson et al. | |
| 2005/0091501 A1 | 4/2005 | Osthoff et al. | |
| 2006/0247872 A1 | 11/2006 | Boutin | |
| 2007/0160083 A1 | 7/2007 | Un et al. | |
| 2007/0230627 A1 | 10/2007 | Veen et al. | |
| 2008/0059867 A1 | 3/2008 | Lin et al. | |
| 2009/0037776 A1 | 2/2009 | McAfee et al. | |
| 2009/0043939 A1 | 2/2009 | Fuessl et al. | |
| 2009/0046771 A1 | 2/2009 | Abe et al. | |
| 2009/0049361 A1 | 2/2009 | Koren et al. | |
| 2009/0055561 A1 | 2/2009 | Ritz et al. | |
| 2009/0292951 A1 | 11/2009 | Fournier et al. | |
| 2011/0213984 A1 | 9/2011 | Orlando et al. | |
| 2012/0082057 A1 | 4/2012 | Welin et al. | |
| 2012/0239256 A1* | 9/2012 | Hammerschmidt | H04L 1/201 714/49 |
| 2013/0094509 A1 | 4/2013 | Chen et al. | |
| 2013/0145214 A1 | 6/2013 | Provencher et al. | |
| 2014/0114562 A1 | 4/2014 | Zhou | |
| 2014/0207953 A1* | 7/2014 | Beck | H04L 67/63 709/225 |
| 2014/0215491 A1 | 7/2014 | Addepalli et al. | |
| 2014/0325288 A1* | 10/2014 | Koenigseder | G06F 11/076 714/47.2 |
| 2014/0350725 A1 | 11/2014 | LaFary et al. | |
| 2014/0372758 A1 | 12/2014 | Agiwal et al. | |
| 2016/0077146 A1* | 3/2016 | Englekirk | H02H 3/046 324/550 |
| 2016/0173220 A1 | 6/2016 | Ferguson et al. | |
| 2016/0255501 A1 | 9/2016 | Phan et al. | |
| 2016/0314081 A1 | 10/2016 | Matsuo et al. | |
| 2016/0350162 A1* | 12/2016 | Schlagenhaft | G06F 11/0757 |
| 2017/0024500 A1 | 1/2017 | Sebastian et al. | |
| 2018/0077146 A1 | 3/2018 | Lonas | |
| 2018/0139145 A1 | 5/2018 | Stanwood et al. | |
| 2018/0232270 A1 | 8/2018 | Otsuka et al. | |
| 2019/0159237 A1 | 5/2019 | Wei et al. | |
| 2019/0201136 A1 | 7/2019 | Shelton, IV et al. | |
| 2019/0378610 A1 | 12/2019 | Barral et al. | |
| 2020/0029343 A1 | 1/2020 | Wang et al. | |
| 2020/0252162 A1 | 8/2020 | DenBoer et al. | |
| 2020/0264944 A1* | 8/2020 | Mehta | G11C 16/26 |
| 2020/0312155 A1 | 10/2020 | Kelkar et al. | |
| 2021/0073098 A1 | 3/2021 | Maruyama | |
| 2021/0282117 A1 | 3/2021 | Bivans | |
| 2021/0105250 A1 | 4/2021 | Grinius et al. | |
| 2021/0105346 A1 | 4/2021 | Pandey | |
| 2021/0173961 A1 | 6/2021 | Young et al. | |
| 2021/0264980 A1* | 8/2021 | Sagron | G06F 11/1068 |
| 2021/0291835 A1 | 9/2021 | Jalali et al. | |
| 2022/0138043 A1* | 5/2022 | Hu | G06F 11/1068 714/819 |
| 2023/0359160 A1* | 11/2023 | Katrak | H04L 43/0823 |

FOREIGN PATENT DOCUMENTS

| | | |
|---|---|---|
| JP | 2016007042 A | 1/2016 |
| JP | 2017022433 A | 1/2017 |
| WO | 2007115272 A1 | 10/2007 |
| WO | 2012122994 A1 | 9/2012 |
| WO | 2018144560 A1 | 8/2018 |
| WO | 2020132258 A1 | 6/2020 |
| WO | 2021178693 A1 | 9/2021 |

OTHER PUBLICATIONS

U.S. Appl. No. 17/332,657, filed May 27, 2021, Kerfegar Khurshed Katrak.

U.S. Appl. No. 17/856,661, filed Jul. 1, 2022, Kerfegar Khurshed Katrak.

U.S. Appl. No. 17/856,700, filed Jul. 1, 2022, Kerfegar Khurshed Katrak.

Baee et al., "Broadcast Authentication in Latency-Critical Applications: On the Efficiency of IEEE 1609.2", IEEE, Dec. 2019, retrieved on [Jul. 3, 2022]. Retrieved from the internet entire document.

Examination Report received in Australian Patent Application No. 2021232001 dated Nov. 9, 2022.

Final Office Action for U.S. Appl. No. 17/192,657 dated Jun. 30, 2023.

International Search Report for International Application No. PCT/US21/20911 dated Jun. 1, 2021.

International Search Report received in PCT/US22/52932 dated Apr. 12, 2023.

Non-Final Office Action for U.S. Appl. No. 17/192,657 dated Oct. 27, 2022.

Notice of Allowance and Fees Due for U.S. Appl. No. 17/192,657 dated Nov. 1, 2023.

O'Dwyer. "Colour-Coded Batteries—Electro-Photonic Materials Circuitry for Enhanced Electrochemical Energy Storage and Optically Encoded Diagnostics." Jan. 19, 2016 (Jan. 19, 2016) Retrieved on Oct. 10, 2022 (Oct. 10, 2022) from entire document.

Office Action received in JP Application No. 2022-552764 dated Mar. 7, 2023.

International Search Report and Written Opinion for International Patent Application No. PCT/US23/32633 mailed on Feb. 21, 2024; 13 pages.

Notification of the International Application Number and of the International Filing Date for International Patent Application No. PCT/US23/32633, mailed on Oct. 2, 2023; 1 page.

* cited by examiner

METHOD FOR DECREASING PROBABILITY OF UNDETECTED ERRORS ON LARGE MESSAGES OVER A BLACK CHANNEL

CROSS-REFERENCE TO RELATED APPLICATIONS

This application claims the benefit of U.S. Provisional Application No. 63/406,130, filed on 13 Sep. 2022, which is incorporated in its entirety by this reference.

This application is related to U.S. patent application Ser. No. 17/192,657, filed on 4 Mar. 2021, and U.S. patent application Ser. No. 18/081,833, filed on 15 Dec. 2022, each of which is incorporated in its entirety by this reference.

TECHNICAL FIELD

This invention relates generally to the field of communications integrity and more specifically to a new and useful method for decreasing probability of undetected errors on large messages over a black channel within the field of communications integrity.

DESCRIPTION OF THE EMBODIMENTS

Figure 1:
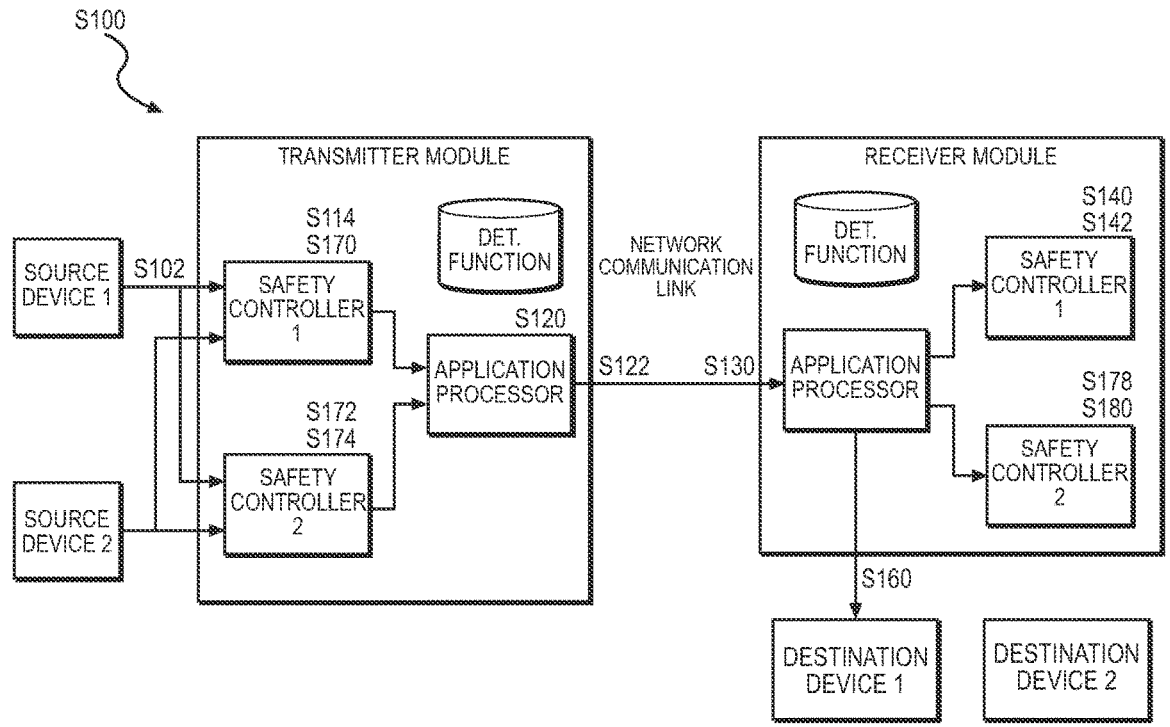
FIG. 1 is a flowchart representation of a method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHODS

As shown in FIGS. 1, 2, 3A, 3B, and 3C, a method S100 includes, at a first communication module: accessing a first set of data in a first data stream from a first device in Block S102; generating a first set of reference data based on a first deterministic function and a first seed value in Block S114; generating a first message including the first set of data and the first set of reference data in Block S120; and transmitting the first message to a second communication module via a first communication link in Block S122.

The method also includes, at the second communication module: receiving the first message from the first communication module via the first communication link in Block S130; extracting the first set of reference data from the first message in Block S132; generating a second set of reference data based on the first deterministic function and the first seed value in Block S140; calculating a first quantity of bit errors in the first set of reference data based on the second set of reference data in Block S142; calculating a first bit error rate of the first communication link based on the first quantity of bit errors in Block S154; in response to the first bit error rate exceeding a first bit error rate threshold for the first data stream, generating a second message representing a fault in Block S156; and transmitting the second message to a second device in Block S160.

1.1 Variation: Detected Bit Error Rate Below Threshold

As shown in FIGS. 1, 2, 3A, 3B, and 3C, one variation of the method S100 includes, at a first communication module: accessing a first set of data in a first data stream from a first device in Block S102; generating a first set of reference data based on a first deterministic function and a first seed value in Block S114; generating a first message including the first set of data and the first set of reference data in Block S120; and transmitting the first message to a second communication module via a first communication link in Block S122.

This variation of the method S100 also includes, at the second communication module: receiving the first message from the first communication module via the first communication link in Block S130; extracting the first set of reference data from the first message in Block S132; generating a second set of reference data based on the first deterministic function and the first seed value in Block S140; calculating a first quantity of bit errors in the first set of reference data based on the second set of reference data in Block S142; defining a total quantity of reference data within a first window of messages, including the first message, from the first communication module via the first communication link in Block S146; based on the first quantity of bit errors, calculating a total quantity of bit errors in the total quantity of reference data within the first window of messages in Block S148; and calculating a first bit error rate of the first communication link based on the total quantity of bit errors and the total quantity of reference data within the first window set of messages in Block S150.

This variation of the method S100 further includes, in response to the first bit error rate falling below a first bit error rate threshold for the first data stream, generating a second message including the first set of data and the first bit error rate in Block S156; and transmitting the second message to a second device in Block S160.

1.2 Variation: Message Window

As shown in FIGS. 1, 2, 3A, 3B, and 3C, one variation of the method S100 includes, at a receiver communication module: receiving a first message from a transmitter communication module via a communication link in Block S130, the first message including a set of sensor data in a data stream from a first sensor device and a first set of reference data based on a deterministic function and a seed value; extracting the first set of reference data from the first message in Block S132; generating a second set of reference data based on the deterministic function and the seed value in Block S140; calculating a first quantity of bit errors in the first set of reference data based on the second set of reference data in Block S142; defining a total quantity of reference data within a first window of messages, including the first message, from the first communication module via the first communication link in Block S146; based on the first quantity of bit errors, calculating a total quantity of bit errors in the total quantity of reference data within the first window of messages in Block S148; calculating a bit error rate of the first communication link based on the total quantity of bit errors and the total quantity of reference data within the first window set of messages in Block S150; in response to the bit error rate exceeding a bit error rate threshold for the data stream, generating a second message representing a fault in Block S158; and transmitting the second message to a second device in Block S160.

2. APPLICATIONS

Generally, Blocks of the method S100 can be executed by a first communication module (e.g., a transmitter module): to receive data in a data stream from a source device; to access a deterministic function (e.g., a pseudorandom bit pattern generator) configured to generate reference data for the data stream; to generate first reference data based on the deterministic function and a seed value (e.g., a serial number of a receiver module, a public key of the receiver module); to generate a first message including the data in the data stream and the first reference data; and to transmit the first message over a communication link (e.g., a black channel exhibiting an unpredictable route and/or quantity of nodes) to a second communication module.

Additionally, Blocks of the method S100 can be executed by the second communication module (e.g., a receiver module): to receive the first message including data in the data stream and the first reference data; to access the deterministic function and the seed value; to generate second reference data based on the deterministic function and the seed value; to characterize a bit error rate of the communication link based on a difference between the first reference data and the second reference data.

Accordingly, Blocks of the method S100 can be executed by the communication modules: to generate identical reference data at each communication module executing a predefined deterministic function and seed value; and to actively monitor the bit error rate of the communication link from the transmitter module to the receiver module based on these reference data transmitted over the communication link. Therefore, by enabling the communication modules to independently generate identical reference data, the communication modules can transmit a single copy of the reference data—rather than multiple copies of the reference data—over the communication link with which to calculate the bit error rate, thereby reducing a total amount of data transmitted over the communication link.

2.1 Control Actions

Additionally, Blocks of the method S100 can be executed by a receiver module: to calculate a confidence level of the bit error rate; to generate a second message specifying the data in the data stream, the bit error rate of the communication link, and/or the confidence level of the bit error rate; and to transmit the second message to a destination device to process the data in the data stream based on the bit error rate and the confidence level.

More specifically, Blocks of the method S100 can be executed by a receiver module: to detect the bit error rate of the communication link exceeding a bit error rate threshold for the data stream; and, in response to detecting the bit error rate of the communication link exceeding a bit error rate threshold for the data stream, to generate the second message representing a fault and including a command to transition an operating mode of the destination device to a degraded operating mode (or safe state).

Accordingly, the receiver module can autonomously execute functional safety operations on behalf of a destination device in response to detecting the bit error rate for the communication link that exceeds the bit error rate threshold for the data stream.

2.2 Variations

As described herein, the method S100 is executed by a communication module including two redundant controllers and a third controller: to execute redundant validation processes on a received message; and to calculate a bit error rate and/or confidence level based on reference data included in the received message. However, a communication module implementing additional redundant controllers (e.g., 4, 8, 16 total redundant controllers) can similarly execute Blocks of the method S100: to execute redundant validation processes on received messages by each redundant controller; and to calculate bit error rates and/or confidence levels based on reference data included in the received messages.

As described herein, the method S100 is executed by two communication modules: to transmit multiple concurrent data streams via a communication link; and to execute a distinct diagnostic procedure for each data stream to calculate a bit error rate of the communication link for the data stream; and to execute control actions based on each bit error rate. However, the communication modules can similarly execute Blocks of the method S100: to transmit a set of concurrent data streams via the communication link; to execute a diagnostic procedure for one data stream in the set of concurrent data streams (e.g., a data stream exhibiting greatest bit rate) to calculate a bit error rate representing the communication link; and to execute control actions for each data stream based on the bit error rate.

3. TERMINOLOGY

Generally, a "data message" herein refers to a message including a set of data in a data stream.

Generally, a "diagnostic message" herein refers to a message including the set of data in the data stream and a set of reference data.

Generally, a "window of messages" herein refers to a group of messages in a population of messages.

Generally, a "bit error rate" herein refers to a metric representing a detected quantity of bits received in error relative to a total number of bits transmitted (e.g., within a window of diagnostic messages).

Generally, a "residual bit error rate" herein refers to a metric representing a likelihood that a received bit will exhibit error absent detection as an erroneous bit.

Generally, a "confidence level" of a bit error rate refers to a likelihood that the bit error rate is accurate.

4. SYSTEM

Generally, as shown in FIG. 1, a system can include a first node (or a "first device"), a first communication module communicatively coupled to the first node, a communication network, a second node (or a "second device"), and a second communication module communicatively coupled to the second node. The system can include additional nodes and/or communication modules communicatively coupled thereto.

In one implementation, the first set of devices can include a first device (or "source device") communicatively coupled to the first communication module (or "transmitter module"), and the second set of devices can include a second device (or "destination device") communicatively coupled to the second communication module (or "receiver module"). In this implementation, the source device can: generate data (e.g., safety state information, command data, control data, sensor data, status information) for the destination device; and transmit the data to the destination device via the transmitter module, the communication network, and the receiver module. More specifically, the source device can generate and output the data to the transmitter module, which can transmit a message—including the data—through the communication network. The receiver module can then receive the message and output the data to the destination device.

4.1 Devices

Generally, a source device can include a device that generates and/or outputs data to a destination device, and a destination device can include any device that receives data and/or is a target for the data. The destination device can execute an action(s) based on the data (or absence of data).

In one example, a source device can include a remotely operated forklift that generates and outputs a series of heartbeat signals in a data stream to a destination device, such as a remote base station. More specifically, the remotely operated forklift can generate and output a heartbeat signal to a first communication module (as a transmitter module), which generates and transmits a first message—including the heartbeat signal—over the communication network. A second communication module (as a receiver module) can receive and output the first message to the remote base station. In response to detecting the heartbeat signal within a threshold time period, the remote base station can continue monitoring for a subsequent heartbeat signal.

However, in response to detecting absence of a heartbeat signal within the threshold time period, the remote base station (as a source device) can issue a command for the remotely operated forklift (as a destination device) to transition to a safe state (e.g., emergency stop, shut down). In particular, the remote base station can generate and output the command to the second communication module (as a transmitter module), which then generates and transmits a second message—including the command—over the communication network. The first communication module (as a receiver module) can receive and output the second message to the remotely operated forklift, which can then transition to the safe state in response to detecting the command.

In another example, a device (e.g., a source device, a destination device) can include a sensor (e.g., a radar sensor, a LiDAR sensor, an ultrasonic sensor, an infrared camera), a machine, a robot, a vehicle (e.g., an autonomous vehicle, a semi-autonomous vehicle), a control system, an emergency stop system (e.g., a line break sensor, an emergency stop button) and/or an industrial system (e.g., a manufacturing system, a farming system, a construction system, a power system, a transportation system), etc.

4.2 Communication Modules

Generally, a communication module can include a set of resources, such as a set of controllers and/or a set of processors, volatile memory (e.g., RAM), non-volatile memory (e.g., a flash storage), a set of network interfaces (e.g., a wireless local area network interface, a wired local area network interface, a Bluetooth network interface), and/or input/output interfaces. Additionally, the communication module can further include: firmware, an operating system (or kernel), a set of applications, and/or logic.

In one implementation, a communication module can include: a first controller (e.g., a first safety controller, a first safety microcontroller); a second controller (e.g., a second safety controller, a second safety microcontroller); a third controller (e.g., a security controller, an application processor); and a communication bus. The communication bus can support: two-way communication between the first controller and the second controller; two-way communication between the first controller and the third controller; and two-way communication between the second controller and the third controller.

In another implementation, the first controller can include: an arithmetic logic unit (hereinafter "ALU"); volatile memory (e.g., random access memory or "RAM"); and non-volatile memory (e.g., flash memory). The ALU can execute arithmetic and logic operations based on computer instructions executed by the first controller. The RAM can temporarily store data retrieved from storage for executing calculations. The flash memory can store data and/or instructions that are programmed into the first controller. The first controller can further include an input/output interface, an internal bus, and/or an internal oscillator. The first controller can include fewer or additional components.

The second controller can include analogous (e.g., similar, identical) components as the first controller. For example, the first controller and the second controller can be redundant controllers, each including identical components.

Furthermore, the third controller can include analogous (e.g., similar, identical) components as the first controller. The third controller can further include a network interface (or a set of network interfaces) for communication over the communication network.

4.2.1 Safety Functionality

In one implementation, a communication module can execute safety critical diagnostics and control functions. For example, a communication module can include hardware and/or software that meet functional safety standards (e.g., IEC 61508, ISO 13849, ISO 26262).

More specifically, the communication module can include a safety subsystem configured to execute functional safety operations, such as issuing commands to transition a device (or a group of devices) from a first operating mode (e.g., a fully functional operating mode) to a second operating mode (e.g., a degraded operating mode, a safe state) and/or communication integrity encapsulation, such as described in U.S. patent application Ser. No. 18/081,833.

4.3 Communication Network

Generally, the communication network can include any transmission medium (e.g., the Internet, a wired communication channel, a wireless communication channel) between the first communication module and the second communication module. In one example, the network can include a direct network connection between the first communication module and the second communication module. In another example, the network can include a set of interstitial relay devices (e.g., electronic relays, routers, gateways) between the first communication module and the second communication module.

4.3.1 Communications Links

Generally, a communication module can include a set of network interfaces for communicating data with other communication modules, nodes, devices, etc. The communication module can establish and maintain a set of communication links based on the set of network interfaces.

In one implementation, a first communication module can include a first set of network interfaces. The first communication module can establish and maintain a set of communication links with a second communication module—through the communication network—based on the first set of network interfaces. The first communication module can communicate (e.g., transmit, receive) data with the second communication module through the set of communication links (or a subset of communication links in the set of communication links).

In another implementation, the first communication module (and the second communication module) can establish and maintain this set of communication links according to a set of communications technologies and/or protocols, such as: Ethernet; 802.11; worldwide interoperability for microwave access (WiMAX); 3G; 4G; 5G; long term evolution (LTE); digital subscriber line (DSL); asynchronous transfer mode (ATM); InfiniBand; PCI Express Advanced Switching; Bluetooth; near field communication (NFC); Industrial, Scientific, Medical (ISM); radio; multiprotocol label switching (MPLS); the transmission control protocol/Internet protocol (TCP/IP); the User Datagram Protocol (UDP); the hypertext transport protocol (HTTP); the simple mail transfer protocol (SMTP); and/or the file transfer protocol (FTP); etc.

In one example, the first communication module includes a Wi-Fi network interface and an LTE interface. In this example, based on these network interfaces, the first communication module establishes—with the second communication module—a Wi-Fi communication link and an LTE communication link. The first communication module then transmits data to (and receive data from) the second communication module via the Wi-Fi communication link and/or the LTE communication link.

In another example, the first communication module includes a first LTE interface and a second LTE interface. In this example, the first communication module: establishes a first LTE communication link with the second communication module based on the first LTE interface; and establishes a second LTE communication link with a third communication module with the second LTE interface.

In one implementation, the first communication module can establish a communication link with the second communication module, the communication link characterized by a black channel exhibiting an unpredictable route through the set of interstitial relay devices and/or exhibiting an unpredictable quantity of interstitial relay devices in the set of interstitial relay devices.

In another implementation, the first communication module can establish a communication link with the second communication module by establishing a communication session based on a particular communication protocol. Additionally or alternatively, the first communication module can establish a communication link with the second communication module based on a network interface configuration (e.g., an operating frequency).

5. DATA COMMUNICATION

Generally, a first communication module (e.g., a transmitter module) can: receive a set of data (e.g., safety information, status information, command data, input data, sensor data) in a data stream from a source node (e.g., a source device); access configuration information and/or a policy associated with the data stream; generate a message including the set of data; and transmit the message over the communication network to a destination node (e.g., a destination device)—via a communication link between the transmitter module and a second communication module (e.g., a receiver module) communicatively coupled to the destination node—according to the policy. More specifically, the first communications module can: access the policy defining a set of target conditions (e.g., a target bit error rate falling below a bit error rate threshold, a target confidence level of the target bit error rate exceeding a confidence level threshold, a residual error rate falling below a residual error rate threshold) for the data stream; and transmit the message via the communication link exhibiting metrics corresponding to the set of target conditions.

The second communications module can: receive the message—including the set of data in the data stream—from the first communication module via the communication link; validate the message and/or the set of data within the message; and output the set of data to the destination node.

Accordingly, because the transmitter module transmits the message via the communication link exhibiting metrics corresponding to the set of target conditions (e.g., requirements) of a data stream—such as a data stream containing safety-critical data—between a source node and a destination node, the system can meet functional safety standards, thereby mitigating safety and/or security vulnerabilities that may lead to operational downtime, intellectual property theft, and/or destruction of work product.

5.1 Data Streams

Block S102 of the method S100 recites accessing a first set of data in a first data stream from a first device.

In one implementation, in Block S102, the transmitter module can receive (or access) a set of data in a data stream from a source device. More specifically, the transmitter module can receive the set of data at a controller (e.g., the application processor) of the transmitter module. Additionally or alternatively, the transmitter module can receive the set of data at a first redundant input of the first controller of the transmitter module (e.g., the first safety controller) and/or at a second redundant input of the second controller of the transmitter module (e.g., the second safety controller).

In one example, during a first time period, the transmitter module receives a first set of sensor data (e.g., analog value(s), digital value(s)) in a data stream from a sensor device. The transmitter device can then receive a second set of data in the data stream from the sensor during a second time period succeeding the first time period.

In another example, during a first time period, the transmitter module receives a first set of video data—in a video data stream—captured by a first optical sensor of a remotely controlled forklift. During a second time period succeeding the first time period, the transmitter module receives a second set of video data—in the video data stream—captured by the first optical sensor of the remotely controlled forklift.

In this example, the transmitter module receives the first set of video data and/or the second set of video data in the video stream exhibiting a bit rate (e.g., 500 kilobits per second, woo megabits per second, 3000 megabits per second).

5.2 Data Classes

Generally, the transmitter module can receive sets of data in a data stream from a source device, the data stream (or the sets of data) characterized by a particular data class in a set of data classes. The transmitter module can transmit the sets of data in the data stream to a receiver module communicatively coupled to a destination module. The receiver module can then output these sets of data to the destination node.

In one implementation, the transmitter module can receive, from a sender device, a data stream characterized by a first data class—in the set of data classes—representing a safety critical data class. For example, the transmitter module can receive a first data stream including safety state information representing a safe state of an emergency stop device commanding a set of machines in a factory to immediately stop operation, the first data stream characterized by the first data class.

In another implementation, the transmitter module can receive, from a source device, a data stream characterized by a second data class—in the set of data classes—representing a real-time command critical data class. In one example, the transmitter module receives a second data stream including a command to a robot to pour molten metal into a mold in response to detecting a temperature of the molten metal exceeding a threshold, the second data stream characterized by the second data class. In another example, the transmitter module receives a third data stream including a video data stream from a remotely operated forklift traversing a factory floor, the third data stream characterized by the second data class.

In another implementation, the transmitter module can receive, from a source device, a data stream characterized by a third data class—in the set of data classes—representing a command critical data class. For example, the transmitter module can receive a fourth data stream including non-real-time instructions to an agriculture robot to control humidity in a greenhouse according to detected temperature throughout a year, the fourth data stream characterized by the third data class.

In another implementation, the transmitter module can receive, from a source device, a data stream characterized by a fourth data class—in the set of data classes—representing an informational data class. For example, the transmitter module can receive a fifth data stream including status information representing a battery level of a machine, the fifth data stream characterized by the fourth data class.

5.3 Data Classification

Block S104 of the method S100 recites classifying the first data stream into a first data class based on the first set of video data.

Generally, the transmitter module can classify a set of data—in a data stream—into a particular data class in a set of data classes. Additionally or alternatively, the transmitter module can classify the data stream into the particular data class.

In one implementation, in Block S104, the transmitter module can classify a data stream into a data class based on a format of the data stream, content of the data stream, an indicator within the data stream, and/or other data from the source node outputting the data stream.

In one example, in response to receiving a first set of data in a first data stream from a first source device, the transmitter module: detects safety state information within the first set of data; and classifies the first data stream into a first data class—representing a safety critical data class—in a set of data classes based on the safety state information. More specifically, the transmitter module: detects an encoded state indicator (or a set of encoded state indicators) representing a safety state of the first source device; and classifies the first data stream into the first data class based on the encoded state indicator.

In another example, in response to receiving a second set of data in a second data stream from the first source device, the transmitter module: detects video data, representing a video data stream from a remotely operated forklift traversing a factory floor, in the second set of data; and classify the second data stream into a second data class—representing a real-time control critical data class—in the set of data classes based on the video data. Alternatively, the transmitter module can classify the second data stream into a fourth data class—representing an informational data class—in the set of data classes based on the video data.

Additionally or alternatively, the transmitter module can detect another indicator (e.g., a flag, code, a header) in a set of data in a data stream; and classify the data stream into a particular data class in the set of data classes based on the indicator.

In another implementation, the transmitter module can classify a data stream into a data class based on information associated with the source device and/or the destination device. In one example, the transmitter module classifies a data stream into a data class based on a first address of the source device and/or a second address of the destination device. In another example, the transmitter module classifies a data stream into a data class based on a first device type of the source device and/or a second device type of the destination device. In yet another example, the transmitter module classifies a data stream into a data class based on a first operating mode of the source device and/or a second operating mode of the destination device.

5.4 Configuration Profiles

Generally, the transmitter module can access a configuration profile for the data stream. More specifically, the transmitter module can access a configuration profile including a policy defining a set of target conditions for communicating the data stream and/or messages containing data from the data stream.

In one implementation, in response to receiving a first set of data—in a first data stream—from a first source device, the transmitter module can access a first configuration profile including a first policy defining a first set of target conditions for the first data stream. For example, the transmitter module can access the first policy defining the first set of target conditions for each message containing data from the first data stream, such as a target bit error rate (or "detected bit error rate") falling below a bit error rate threshold, a target confidence level—for a detected bit error rate—exceeding a confidence level threshold, a target residual bit error rate (or "undetected bit error rate") falling below a residual bit error rate threshold, etc. Additionally or alternatively, the transmitter module can access the first policy defining: the bit error rate threshold; the confidence level threshold, and/or the residual bit error rate threshold.

5.4.1 Configuration Profile Based on Data Class

Block S106 of the method S100 recites accessing a first policy associated with the first data class, the first policy defining the first bit error rate threshold.

In one implementation, in Block S106, the transmitter module can access a policy based on a data class of the data stream. More specifically, the transmitter module can identify a data class of the data stream based on a format of the data stream, content of the data stream, an indicator within the data stream, and/or other data from the source device outputting the data stream. The transmitter module can access a policy—in a set of policies—corresponding to the data class of the data stream.

In one example, in response to classifying a first data stream into a first data class (e.g., a safety critical data class), the transmitter module accesses a first policy corresponding to the first data class and defining a first set of target conditions associated with the first data class. In this example, the transmitter module accesses the first policy defining the first set of target conditions including: a first target latency falling below a first latency threshold (e.g., 25 milliseconds), a first target bit error rate falling below a first bit error rate threshold (e.g., 0.001%), a first target confidence level of the first target bit error rate falling below a first confidence level threshold (e.g., 99.9%), a first target signal strength exceeding a first signal strength threshold, a first target power consumption (e.g., power consumption per message) falling below a first power consumption threshold, a first target monetary cost (e.g., monetary cost per message) falling below a first monetary cost threshold, etc.

In another example, in response to classifying a second data stream into a second data class (e.g., a control critical data class), the transmitter module accesses a second policy corresponding to the second data class and defining a second set of target conditions associated with the second data class. In this example, the transmitter module accesses the second policy defining the second set of target conditions including: a second target latency falling below a second latency threshold (e.g., 200 milliseconds); a second target error rate falling below a second bit error rate threshold (e.g., 0.01%); a second target confidence level of the second target bit error rate falling below a second confidence level threshold (e.g., 99.9%); a second target signal strength exceeding a second signal strength threshold; a second target power consumption falling below a second power consumption threshold; and a second target monetary cost falling below a second monetary cost threshold, etc.

5.4.2 Configuration Profile Based on Stream ID

In one implementation, the transmitter module can access a configuration profile based on an identifier (or "stream ID") of the data stream. For example, the transmitter module can: detect a stream ID included within a data stream; and access a configuration profile associated with the stream ID and including a policy defining a set of target conditions for the data stream. More specifically, the transmitter module can access a set of data—in the data stream—including the stream ID of the data stream.

Accordingly, the system can implement a unique configuration file for each data stream, thereby enabling each configuration file to define a specific set of target conditions (e.g., requirements) for the data stream.

Additionally or alternatively, the transmitter module can access the configuration profile based on the stream ID of the data stream, the configuration profile defining other information associated with the data stream, such as a bit rate (e.g., a transmission bit rate) of the data stream, a deterministic function for generating reference data for the data stream, etc.

5.4.3 Configuration Profile Based on Operating Mode

In one implementation, the transmitter module can access a configuration profile in the set of configuration files based on an operating mode of a source device and/or a destination device.

More specifically, the transmitter module can: detect a stream ID included within a data stream; and access a subset of configuration profiles associated with the stream ID, each configuration profile in the subset of configuration profiles corresponding to an operating mode of a source device and/or an operating mode of a destination device. In response to detecting the operating mode of the source device and/or the operating mode of the destination device, the transmitter module can access a configuration file— corresponding to the detected operating mode(s)—in the subset of configuration files.

For example, a transmitter module communicatively coupled to a remotely operated forklift drone can: detect a stream ID for a data stream representing a video feed to a remote base receiver; and access a subset of configuration profiles—associated with the stream ID—including a first configuration profile for a first operating mode (e.g., a fully functional operating mode exhibiting a first maximum speed of ten miles per hour) of the remotely operated forklift and a second configuration profile for a second operating mode (e.g., a degraded operating mode exhibiting a second maximum speed of one mile per hour) of the remotely operated forklift. During a first time period, the transmitter module can access the first configuration profile—defining a first set of target conditions (e.g., a first bit error rate threshold, a first confidence level threshold)—in response to detecting the first operating mode of the remotely operated forklift (e.g., based on a first status message from the remotely operated forklift). However, during a second time period succeeding the first time period, in response to detecting the second operating mode of the remotely operated forklift (e.g., based on a second status message from the remotely operated forklift), the transmitter module can access the second configuration profile defining a second set of target conditions (e.g., a second bit error rate threshold exceeding first bit error rate threshold, the first confidence level threshold).

Accordingly, the system can implement a unique configuration file for each data stream and for each operating mode of a source device and/or a destination device, thereby enabling each configuration file to define an appropriate set of requirements corresponding to the operating mode.

5.5 Message Generation

Generally, the transmitter module can generate a message (or packet)—including a set of data in a data stream—based on a set of target conditions and/or a set of requirements defined in a configuration profile for the data stream.

For example, the transmitter module can access the configuration profile—defining the set of requirements including a source authentication requirement, an encryption requirement, a redundant frame requirement, an error code correction requirement, a variable encoding requirement, a periodicity requirement, and a latency requirement—for the data stream and generate a message based on this set of requirements. In this example, the transmitter module can generate a message including: source authentication information (e.g., a signature); encryption session information (e.g., an encryption key, an encryption seed); and a set of redundant signals representing a set of data of the data stream. The set of redundant signals can include: a first signal including the set of data encoded with a first encoding scheme, a timing reference (e.g., a sequence number, a timestamp), and a first error detecting value (e.g., a first cyclic redundancy check (CRC) value, a first turbo code, a first Viterbi code); and a second signal including the set of data encoded with a second encoding scheme, the timing reference, and a second error detecting value (e.g., a second CRC value, a second turbo code, a second Viterbi code).

Accordingly, the transmitter module can generate messages according to a configuration profile of the data stream, thereby maintaining security and/or integrity requirements of the data stream and the entire system while communicating this data stream across an untrusted communication network.

5.5.1 Data Integrity

In one implementation, a communication module can calculate a residual bit error rate ($R_{CRC}$) of a message that is protected by an error detecting value (e.g., a CRC value, a turbo code, a Viterbi code) based on Equation 1, where $P_e$ corresponds to a probability of bit error, n corresponds to a quantity of transmitted bits, r corresponds to a bit length of the error detecting value, and $d_{min}$ corresponds to a hamming distance (e.g., a quantity of error bits guaranteed to be detected) of the error detecting polynomial (e.g., the CRC polynomial).

$$R_{CRC}(P_e) \approx 2^{-r} \times \sum_{k=d_{min}}^{n} \binom{n}{k} \times P_e^k \times (1 - P_e)^{n-k} \qquad \text{(Equation 1)}$$

In another implementation, a communication module can calculate a residual bit error rate per hour ($\Lambda(P_e)$) based on Equation 2, where $P_e$ corresponds to a probability of bit error per message, v corresponds to a quantity of messages per hour, and b corresponds to a quantity of receiving stations (e.g., receiver modules).

$$\Lambda(P_e) = R(P_e) \times v \times b \quad \text{(Equation 2)}$$

Generally, based on functional safety standards (e.g., IEC 61784), a communication module can calculate the residual bit error rate (e.g., per message, per hour) of a communication link based on $P_e$ corresponding to a predefined first value (e.g., $10^{-2}$) in response to absence of a detected bit error rate falling below the first value.

Alternatively, in response to detecting a bit error rate exhibiting a second value falling below the first value, the communication module can calculate the residual bit error rate (e.g., per message, per hour) of a communication link based on $P_e$ corresponding to the second value for Equation 1 and/or Equation 2. For example, the communication module can detect the bit error rate based on an active measurement of network error performance.

Accordingly, by actively detecting the bit error rate of a communication link as a detected bit error rate, the communication module can calculate the residual bit error rate based on the detected bit error rate rather than based on a predefined bit error rate exceeding the detected bit error rate. Therefore, the communication module can simplify implementation of CRC protection for longer messages (e.g., messages including video data, messages including data in a data stream exhibiting a relatively high bit rate) according to Equation 1.

6. ACTIVE COMMUNICATION LINK CHARACTERIZATION

Figure 2:
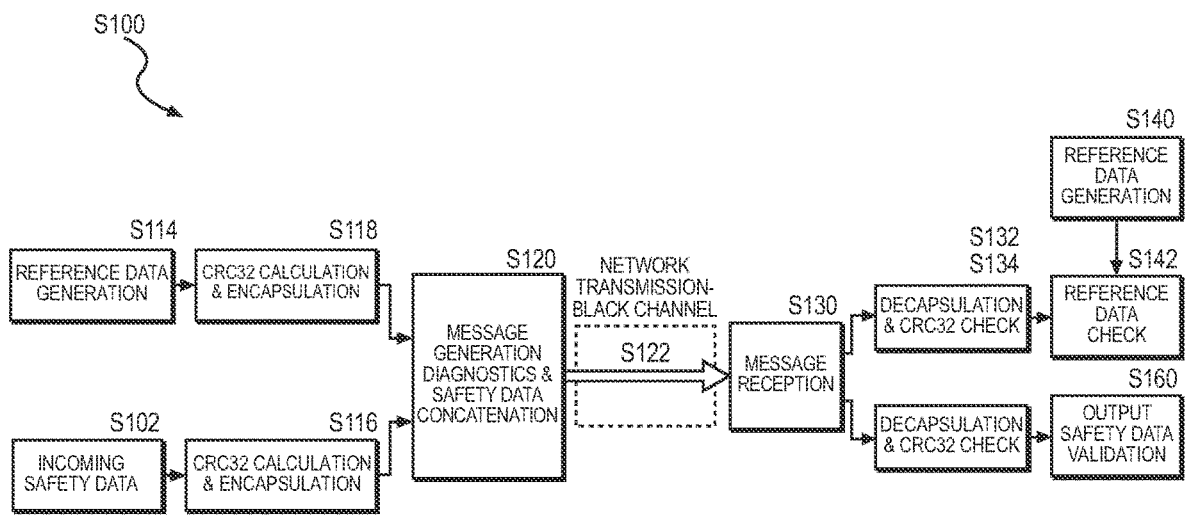
FIG. 2 is a flowchart representation of one variation of the method.
Figure 3A:
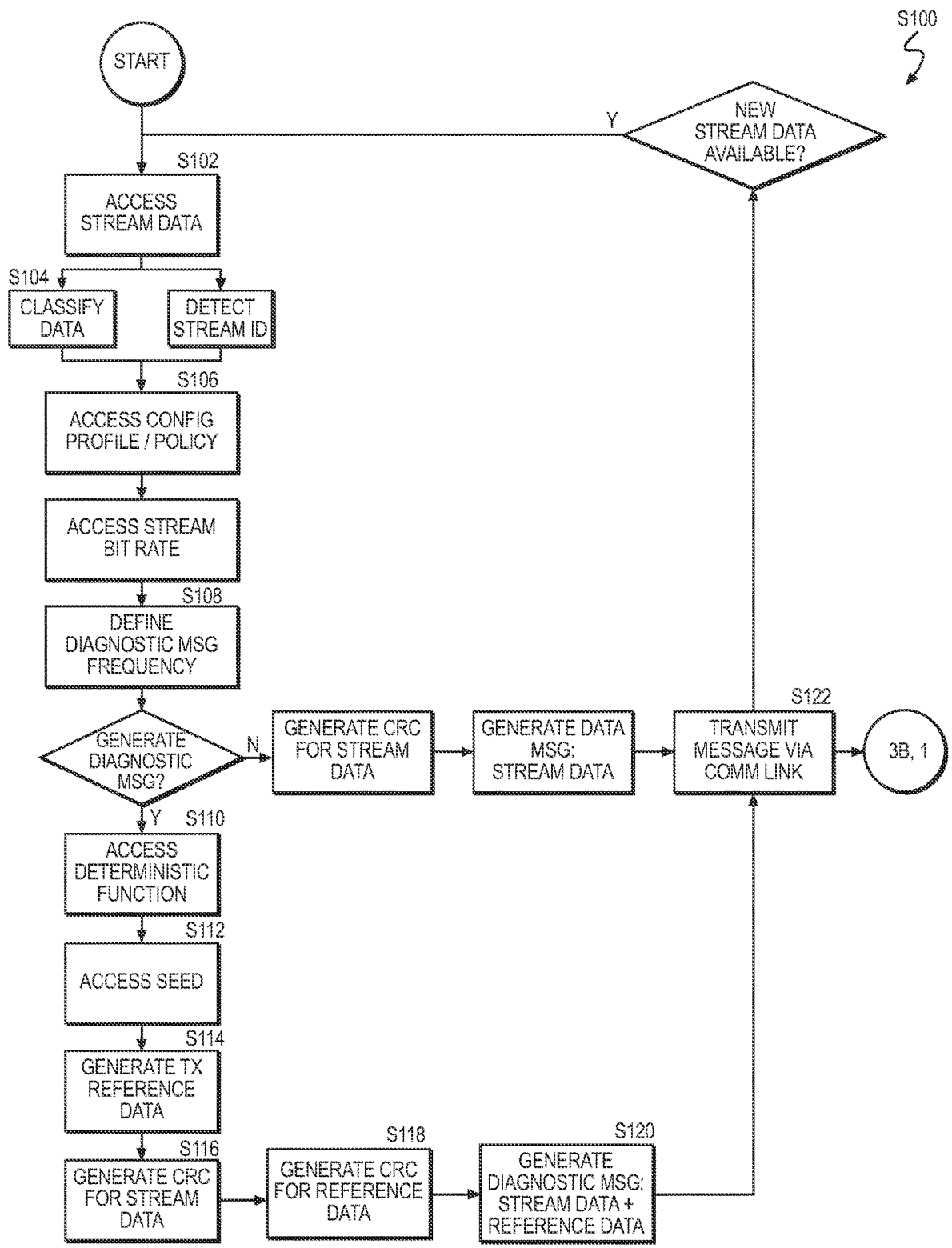
FIGS. 3A, 3B, and 3C are flowchart representations of one variation of the method.
Figure 3B:
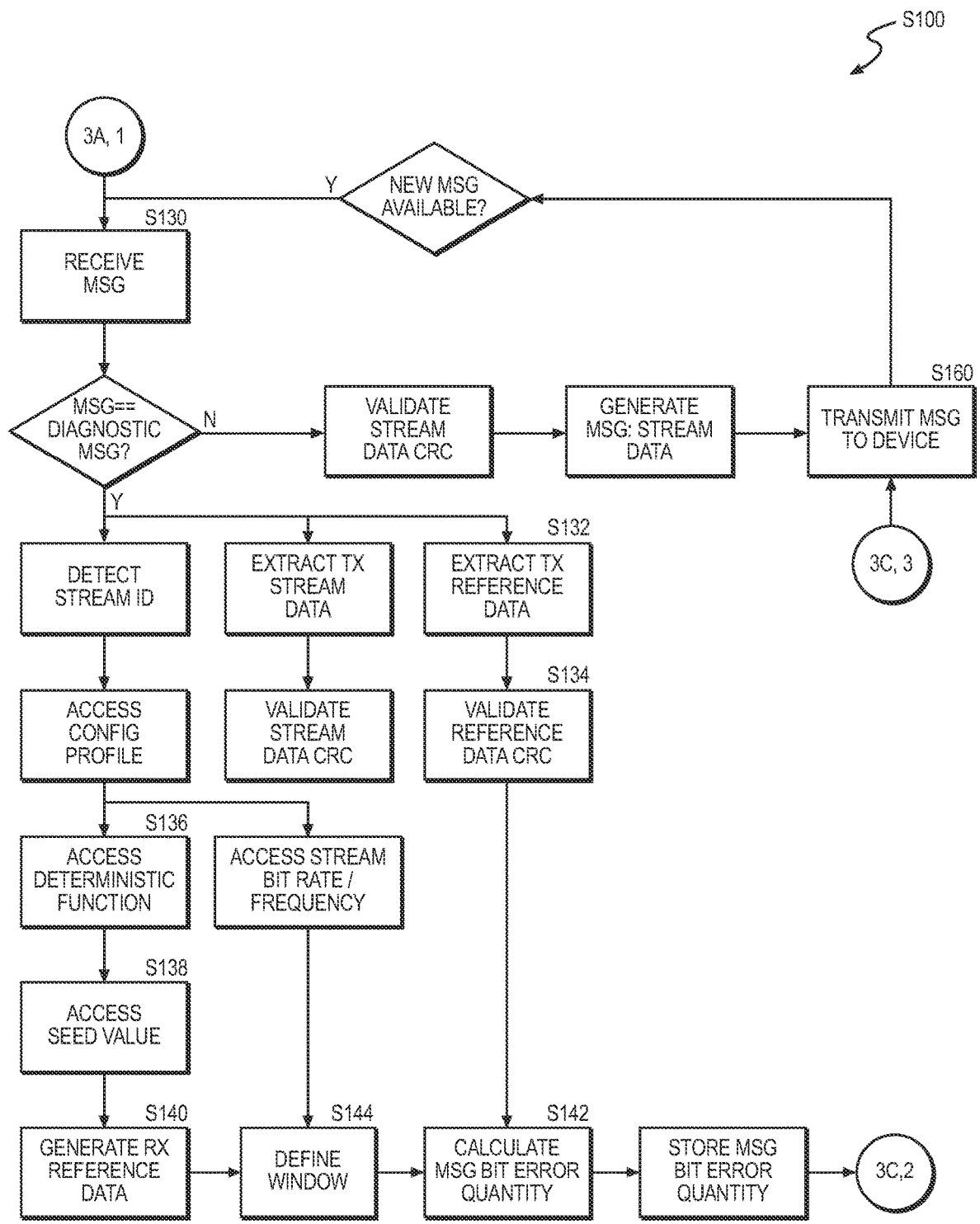
Figure 3C:
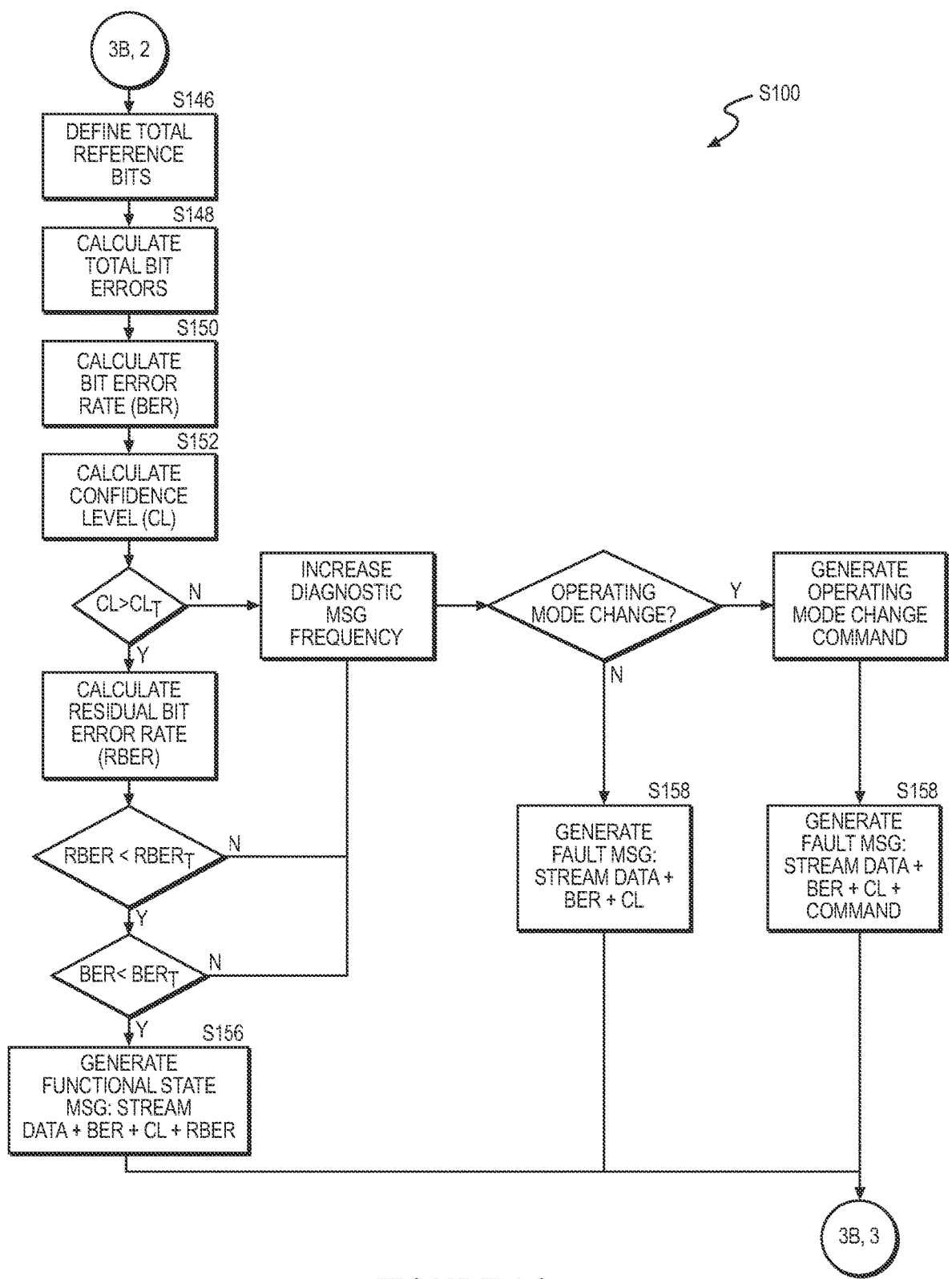

Generally, as shown in FIGS. 1, 2, and 3A, a transmitter module can: access a set of data (e.g., safety information, status information, command data, input data, sensor data) in a data stream from a source device; generate a message including the set of data (e.g. as a "data message"); and transmit the message over the communication network to a destination device via a communication link between the transmitter module and a receiver module. The transmitter module can generate and transmit a set of messages—containing sets of data in the data stream—to the receiver module.

Additionally, for a subset of messages in the set of messages, the transmitter module and the receiver module can communicate a message including a set of data in the data stream and reference information (e.g., as a "diagnostic message") to execute active measurement of network error performance for the communication link.

More specifically, the transmitter module can: generate a first set of reference data (e.g., based on a deterministic function); encapsulate the reference data in a message including a set of data (e.g., sensor data) in a data stream; and transmit the message—including the set of data and the reference data—to the receiver module via the communication link.

Accordingly, the transmitter module can: combine the set of data in the data stream with the set of reference data into a single message; and transmit the message to the receiver module via the communication link. Therefore, the transmitter module can: improve accuracy of performance measurement by ensuring that the set of data in the data stream and the set of reference data are transmitted through the same communication link according to the same network conditions.

As shown in FIGS. 1, 2, 3B, and 3C, the receiver module can: receive the message from the transmitter module via the communication link; generate a second set of reference data (e.g., based on the deterministic function); and calculate a bit error rate of the message based on a difference between the first set of reference data—included in the message—and the second set of reference data. Additionally, the receiver module can calculate a bit error rate of the communication link based on a total quantity of bit errors in a total quantity of reference data within a group (or "window") of messages from the transmitter module to the receiver module via the communication link.

Accordingly, the receiver module can: generate the second set of reference data identical to the first set of reference data; validate the first set of reference data transmitted through the communication link based on the second set of reference data; and calculate the bit error rate of the communication link based on a difference between the second set of reference data and the first set of reference data. Therefore, by enabling the transmitter module and the receiver module to generate identical reference data (e.g., based on a predefined deterministic algorithm), the system can transmit a single copy of the reference data—rather than multiple copies of the reference data—over the communication link with which to calculate the bit error rate, thereby reducing a total amount of data transmitted over the communication network.

6.1 Data Access and Stream Identification

In one implementation, in Block S102, a transmitter module can access a first set of data in a first data stream from a first device, the first set of data including a first identifier (e.g., a stream ID) of the first data stream.

Additionally or alternatively, in response to accessing the first set of data exhibiting a particular data type (or content), the transmitter module can classify the first data stream into a data class—in a set of data classes—based on the particular data type (or content) in Block S104. For example, in response to accessing the first set of data including a first set of video data, the transmitter module can classify the first data stream into a first data class based on the first set of video data.

In response to accessing the first set of data, the transmitter module can access a first configuration profile—associated with the first data stream—based on the first set of data including: the first identifier; and/or the data type or content (e.g., the set of video data). More specifically, the transmitter module can access the first configuration profile defining: a policy defining a set of target conditions for communicating the first data stream and/or messages containing data from the first data stream; a bit rate of the first data stream; a first frequency (e.g., 30 messages per second, sixty messages per second) at which to generate and transmit data messages (e.g., messages including a set of data in the data stream) for the first data stream; a second frequency (e.g., fifteen messages per second, 30 messages per second) at which to generate and transmit diagnostic messages (e.g., messages including a set of data in the data stream and a set of reference data) for the first data stream; a deterministic function for generating reference data for the first data stream; a bit error rate threshold for the first data stream; a confidence level threshold of the bit error rate threshold for the first data stream; and/or other information associated with the first data stream.

6.2 Diagnostic Message Frequency

Block S108 of the method S100 recites defining the first frequency based on a bit rate of the first data stream.

Generally, the transmitter module can generate and transmit a set of messages—including data in a data stream (or "data messages")—to the receiver module according to a particular frequency (e.g., the first frequency, 30 messages per second, 60 messages per second) based on the bit rate of the data stream.

In one implementation, the transmitter module can define a first frequency at which to generate and transmit a set of messages, each message in the set of messages including a set of data in the first data stream. For example, the transmitter module can define the first frequency based on the bit rate of the first data stream and/or the first frequency specified in the first configuration profile of the first data stream. The transmitter module can define the set of messages to be generated by the transmitter module and transmitted to the receiver module, each message in the set of messages generated and transmitted at the first frequency (e.g., during a first time period).

In another implementation, in Block S106, the transmitter module can define a second frequency at which to generate a diagnostic message including a set of data in the first data stream and a set of reference data. In one example, the transmitter module defines the second frequency at which to generate a diagnostic message based on (e.g., proportional to) the bit rate of the first data stream defined in the first configuration profile. In another example the transmitter module defines the second frequency at which to generate a diagnostic message based on (e.g., corresponding to) the second frequency defined in the first configuration profile. The transmitter module can define a set of diagnostic messages (e.g., a subset of messages in the set of messages) to be generated by the transmitter module and transmitted to the receiver module, each message in the set of diagnostic messages generated and transmitted at the second frequency (e.g., during the first time period).

For example, the transmitter module can: define a first frequency, corresponding to 60 messages per second, at which to generate and transmit the set of messages; define the second frequency, corresponding to ten messages per second, at which to generate the set of diagnostic messages (i.e., a subset of messages in the set of messages); define the set of messages (i.e., 60 messages), each message in the set of messages generated and transmitted at the first frequency during a first time period exhibiting a duration of one second; and define the set of diagnostic messages (i.e., ten messages), each message in the set of diagnostic messages generated and transmitted at the second frequency during the first time period exhibiting the duration of one second. In this example, during the first time period, the transmitter module generates and transmits the set of messages exhibiting a first quantity of 60 messages, the set of messages including the set of diagnostic messages exhibiting a second quantity of ten messages. More specifically, during the first time period, the transmitter module generates and transmits the set of messages, every sixth message in the set of messages characterized by a diagnostic message and including a set of reference data.

6.3 First Reference Data

Blocks of the method S100 recite, in response to accessing the first set of data including a first identifier of the first data stream: accessing the first deterministic function based on the first identifier of the first data stream in Block S110; and accessing the first seed value including a second identifier of the second communication module in Block S112.

Block S114 of the method S100 recites generating a first set of reference data based on a first deterministic function and a first seed value.

In one implementation, in Block S110, the transmitter module can access a deterministic function for generating reference data for the first data stream. More specifically, the transmitter module can access the deterministic function in response to accessing the first configuration profile—defining the deterministic function—based on the first identifier.

In one example, the transmitter module accesses the deterministic function including a pseudorandom bit pattern.

In another example, the transmitter module accesses the deterministic function configured to generate a set of reference data exhibiting a bit length based on the bit rate of the first data stream and/or the bit error rate threshold associated with the first data stream.

In another implementation, in Block S112, the transmitter module can access a seed value for the deterministic function. In one example, the transmitter module accesses the seed value including (or representing) a first identifier (e.g., a serial number, a public key) of the transmitter module. In another example, the transmitter module accesses the seed value including (or representing) a second identifier (e.g., a serial number, a public key) of the receiver module. The transmitter module can access the seed value including (or representing) other information, such as a data value(s), a timing reference (e.g., a sequence number, a timestamp) of a message, etc.

In another implementation, in Block S114, the transmitter module can generate a first set of reference data based on the deterministic function and the seed value. More specifically, the transmitter module can generate the first set of reference data exhibiting a bit length based on the bit rate of the first data stream and/or the bit error rate threshold associated with the first data stream.

Accordingly, by generating the set of reference data exhibiting a bit length based on the bit rate of the first data stream and/or the bit error rate threshold, the system module can thereby transmit a sufficient (e.g., statistically significant) quantity of reference bits to characterize the communication link and/or to calculate the bit error rate (e.g., according to Equation 1 and/or Equation 2) at a resolution to fall below the bit error rate threshold.

6.4 Diagnostic Message Generation & Transmission

Blocks of the method S100 recite: generating a first message including the first set of data and the first set of reference data in Block S120; and transmitting the first message to a second communication module via a first communication link in Block S122.

In one implementation, in Block S120, the transmitter module can generate a first message including the first set of data in the first data stream and the first set of reference data. More specifically, the transmitter module can generate the first message in a first set of diagnostic messages, each message in the first set of diagnostic messages generated at the second frequency—defined in Block S108—during a first time period.

Additionally, the transmitter module can generate the first message further including the first identifier of the first stream. In one example, the transmitter module generates the first message further including the first identifier of the first stream within the first set of data. In one example, the transmitter module generates the first message further including the first identifier of the first stream within a stream ID field of the first message.

In another implementation, the transmitter module can: generate a first error detecting value (e.g., a first CRC value, a first checksum value, a first turbo code, a first Viterbi code) based on the first set of data in the first data stream in Block S116; and generate a second error detecting value (e.g., a second CRC value, a second checksum value, a second turbo code, a second Viterbi code) based on the first set of reference data in Block S118. In Block S120, the transmitter module can generate the first message including: the first set of data; the first error detecting value; the first set of reference data; and the second error detecting value.

In another implementation, in Block S122, the transmitter module transmits the first message to the receiver module via the first communication link.

6.6 Diagnostic Message Reception & Validation

Blocks of the method S100 recite: receiving the first message from the first communication module via the first communication link in Block S130; extracting the first set of reference data from the first message in Block S132; and validating the first set of reference data based on the second error detecting value in Block S134.

In one implementation, the receiver module can: receive the first message from the transmitter module via the first communication link in Block S130; and extract the first set of reference data from the first message in Block S132.

Additionally, the receiver module can extract the first set of data and/or the first identifier of the first data stream from the first message. The receiver module can access the first configuration profile for the first data stream based on the first identifier, the first configuration profile defining: the deterministic function; the policy defining the set of target conditions for communicating the first data stream and/or messages containing data from the first data stream; the bit rate of the first data stream; the deterministic function for generating reference data for the first data stream; the bit error rate threshold for the first data stream; the confidence level threshold of the bit error rate threshold for the first data stream; etc.

In another implementation, the receiver module can: validate the first set of data based on the first error detecting value; and validate the first set of reference data based on the second error detecting value in Block S134.

6.7 Second Reference Data

Blocks of the method S100 recite: in response to receiving the first message, accessing the first deterministic function based on the first identifier of the first data stream in Block S136; and accessing the first seed value including the second identifier of the second communication module in Block S138; and generating a second set of reference data based on the first deterministic function and the first seed value in Block S140.

Generally, the receiver module can implement methods and techniques described above to generate a second set of reference data based on the deterministic function and the seed value.

In one implementation, the receiver module can: access the deterministic function—defined in the first configuration profile—based on the first identifier of the first data stream in Block S136; access the seed value (e.g., the identifier of the transmitter module, the identifier of the receiver module) in Block S138; and generate the second set of reference data based on the deterministic function and the seed value in Block S140. More specifically, the receiver module can generate the second set of reference data exhibiting a bit length based on the bit rate of the first data stream and/or the bit error rate threshold associated with the first data stream.

6.8 Bit Error Rate Characterization

Blocks of the method S100 recite: calculating a first quantity of bit errors in the first set of reference data based on the second set of reference data in Block S142; and calculating a first bit error rate of the first communication link based on the first quantity of bit errors in Block S150.

Block S144 of the method S100 recites defining a quantity of messages in the first window of messages based on the first frequency.

In one implementation, in Block S142, the receiver module can calculate a first quantity of bit errors in the first set of reference data based on the second set of reference data. For example, the receiver module can aggregate the quantity of bit errors based on a bitwise comparison of the first set of reference data in the first message and the second set of reference data.

In another implementation, the receiver module can store the first quantity of bit errors in the first configuration profile. For example, the receiver module can: associate the first quantity of bit errors with the first message (e.g., based on an identifier of the first message, based on a sequence number of the first message); and store the first quantity of bit errors—in association with the first message—in the first configuration profile.

In another implementation, in Block S150, the receiver module can calculate a first bit error rate of the first communication link based on the first quantity of bit errors. More specifically, the receiver module can calculate the first bit error rate based on a total quantity of bit errors—including the first quantity of bit errors—and a total quantity of reference data within a first window of messages (e.g., a window of diagnostic messages) including the first message.

In one implementation, in Block S144, the transmitter module can define a quantity of messages in the first window of messages. In one example, the transmitter module defines the quantity of messages in the first window of messages based on the frequency at which diagnostic messages (e.g., messages including a set of data in the data stream and a set of reference data) are generated and transmitted for the first data stream. In another example, the receiver module defines the quantity of messages in the first window of messages based on a confidence level of a bit error rate of the first communication link, as described below.

In another implementation, the receiver module can: define a total quantity of reference data (e.g., a total quantity of bits of reference data) within the first window of messages—including the first message—from the first communication module via the first communication link in Block S146; and calculate a total quantity of bit errors (e.g., a total quantity of detected bit errors) in the total quantity of reference data within the first window of messages based on the first quantity of bit errors in Block S148. More specifically, for each message in the window of messages, the receiver module can: access the first configuration profile storing a quantity of bit errors within the message; and aggregate the quantity of bit errors within the message into the total quantity of bit errors.

The receiver module can then calculate the first bit error rate based on the total quantity of bit errors and the total quantity of reference data within the first window of messages in Block S150. For example, the receiver module can calculate the first bit error rate corresponding to a ratio of the total quantity of bit errors and the total quantity of reference data within the first window of messages.

Accordingly, the receiver module can: define a sliding window of transmitted messages; aggregate a total quantity of reference bits—within the sliding window of transmitted messages—and a total quantity of bit errors in the total quantity of reference bits; and calculate a bit error rate based on the total quantity of bit errors and the total quantity of reference bits within the sliding window of transmitted messages. Therefore, the receiver module can: execute a real-time diagnostic of the communication link representing time-varying performance of the communication link while minimizing masking of a burst of bit errors within an extended history of error-free data transmission.

In one implementation, the receiver module can calculate the total quantity of bit errors and calculate the first bit error rate in response to receiving—from the transmitter module via the first communication link—a quantity of diagnostic messages corresponding to the quantity of messages defined for the first window of messages.

6.9 Confidence Level

Block S152 of the method S100 recites calculating a first confidence level of the first bit error rate based on: the first bit error rate; the total quantity of bit errors; and the total quantity of reference data within the first window of messages.

Generally, in Block S152, the receiver module can calculate a confidence level of the first bit error rate of the first communication link.

In one implementation, in Block S152, the receiver module can calculate a first confidence level of the first bit error rate based on: the first bit error rate threshold; the total quantity of bit errors; and the total quantity of reference data within the first window of messages. More specifically, the receiver module can calculate the confidence level CL based on Equation 3, where N corresponds to the total quantity of reference data (bits), E corresponds to a total quantity of bit errors (e.g., a total quantity of detected bit errors), and $BER_t$ corresponds to a target bit error rate (or the bit error rate threshold).

$$CL = 1 - e^{-N \times BER_t} \times \sum_{k=0}^{E} \frac{(N \times BER_t)^k}{k!} \qquad \text{(Equation 3)}$$

Accordingly, the receiver module can calculate the first confidence level representing a likelihood that the first bit error rate is accurate. Therefore, in response to the first confidence level exceeding a confidence level threshold (e.g., 99.9%), the receiver module can: calculate a probability of bit error for the communication link based on (e.g., corresponding to) the bit error rate; and calculate a residual bit error rate based on the probability of bit error, such as based on Equation 1 and/or Equation 2.

6.10 Residual Bit Error Rate

Block S154 of the method S100 recites calculating a first residual bit error rate of the first data stream based on the first bit error rate.

In one implementation, in Block S154, the receiver module can calculate a residual bit error rate of the first communication link based on the first bit error rate. More specifically, the receiver module can calculate a residual bit error rate of the first data stream based on the first bit error rate in response to the first confidence level exceeding the first confidence level threshold (e.g., defined in the first configuration profile, 99.9%). For example, the receiver module can calculate the residual bit error rate based on Equation 1 and/or Equation 2.

6.11 Output Message

Generally, in Blocks S156, S158, and S160, the receiver module can: generate a second message including the set of data; and transmit the second message to the destination device.

In one implementation, in Blocks S156 and S158, the receiver module can generate the second message including: the first set of data in the first data stream; the first bit error rate; the first confidence level; and/or the residual bit error rate. Additionally, the receiver module can generate the second message further including the first identifier of the first data and/or other information associated with the first data stream.

In another implementation, the receiver module can generate a first score representing performance of the first communication link based on: the first bit error rate; the first bit error rate threshold; the first confidence level; and/or the first confidence level threshold. In this implementation, the receiver module can generate the second message further including the first score.

The receiver module can transmit the second message to the destination device in Block S160.

Accordingly, the receiver module can fuse a set of data in a data stream with a set of metrics (e.g., the bit error rate, the confidence level, the residual bit error rate, the score) representing trustworthiness of the set of data, thereby enabling the destination device to detect that the set of data meets a set of requirements specific to the destination device (or fails to meet this set of requirements) based on the set of metrics.

6.12 Subsequent Diagnostic Messages

The transmitter module and the receiver module can repeat this process for subsequent sets of data in the first data stream and subsequent messages between the transmitter module and the receiver module.

For example, the receiver module can: access a second set of data in the first data stream; generate a third set of reference data based on the deterministic function and the seed value; generate a third message including the second set of data and the third set of reference data; and transmit the third message to the receiver module via the first communication link.

In this example, the transmitter module can: receive the third message from the transmitter module via the first communication link; extract the third set of reference data from the subsequent message; generate a fourth set of reference data based on the deterministic function and the seed value; define a second quantity of messages in a second window of messages—including the first message and the third message—from the transmitter module via the first communication link; define a second total quantity of reference data within the second window of messages; calculate a second quantity of bit errors in the third set of reference data based on the fourth set of reference data; based on the second quantity of bit errors, calculate a second total quantity of bit errors in the second total quantity of reference data within the second window of messages; and calculate a second bit error rate of the first communication link based on the second total quantity of errors.

Additionally, the receiver module can calculate a second confidence level of the second bit error rate based on: the first bit error rate threshold; the second total quantity of bit errors; and the second total quantity of reference data within the second window of messages.

Furthermore, the receiver module can calculate a second residual bit error rate based on the second bit error rate. More specifically, the receiver module can calculate a second residual bit error rate based on the second bit error rate in response to the second confidence level exceeding the first confidence level threshold.

The receiver module can generate a fourth message including: the second set of data in the first data stream; the second bit error rate; the second confidence level; the first identifier of the first data; and/or other information associated with the first data stream. The receiver module can then transmit the fourth message to the destination device.

7. CONTROL ACTIONS

Blocks of the method S100 recite: in response to the first bit error rate exceeding a first bit error rate threshold for the first data stream, generating a second message representing a fault in Block S158; and transmitting the second message to a second device in Block S160.

Generally, the receiver module can: calculate the first bit error rate; and execute an action (or a set of actions) based on the first bit error rate and a bit error rate threshold for a data stream.

In one implementation, in Block S150, the receiver module can calculate the first bit error rate.

In another implementation, in response to the first bit error rate falling below the first bit error rate threshold for the first data stream, the receiver module can generate the second message representing a functional state of the first communication link in Block S156. More specifically, the receiver module can generate the second message representing the functional state of the first communication link in response to: the first bit error rate falling below the bit error rate threshold for the first data stream; the first confidence level exceeding the confidence level threshold for the first data stream; and the first residual bit error rate falling below the residual bit error rate threshold for the first data stream.

Alternatively, in response to the first bit error rate exceeding the first bit error rate threshold for the first data stream, the receiver module can generate the second message representing a fault in Block S158. More specifically, the receiver module can generate the second message—representing a fault state of the first communication link, the source device, and/or the destination device—in response to: the first bit error rate exceeding the bit error rate threshold for the first data stream; the first confidence level falling below the confidence level threshold for the first data stream; and/or the residual bit error rate falling below the residual bit error rate threshold for the first data stream.

In another implementation, in Block S160, the receiver module can transmit the second message to the destination device. Additionally or alternatively, the receiver module can transmit the second message to the source device and/or another receiver (e.g., a receiver module, a device, a zone controller).

7.1 Operating Mode Change

Generally, the receiver module can issue a command to the destination device (or source device) to transition to a particular operating mode (e.g., a degraded operating mode) in response to detecting a bit error rate falling below a bit error rate threshold. More specifically, the receiver module can: detect an operating mode of the source device and/or the destination device; access a configuration profile for a data stream based on the detected operating modes, the configuration profile defining a threshold; calculate a bit error rate for a communication link; and issue the command in response to the bit error rate exceeding the bit error rate threshold defined in the configuration profile.

In one implementation, in Block S158, the receiver module can generate the second message including a command (or signal) to transition the destination device from a first operating mode to a second operating mode in response to: the first bit error rate exceeding the bit error rate threshold for the first data stream; the first confidence level falling below the confidence level threshold for the first data stream; and/or the residual bit error rate falling below the residual bit error rate threshold for the first data stream.

In one example, the receiver module generates the second message including a first command (or signal) to transition the destination device from the first operating mode (e.g., a fully functional operating mode, a degraded operating mode) to the second operating mode representing a safe state (e.g., cease operation, shut off power, disengage fuel supply).

In another example, the receiver module generates the second message including a second command (or signal) to transition the destination device from a fully functional operating mode to a degraded operating mode.

In another implementation, in Block S160, the receiver module can transmit the second message to the destination device.

Additionally or alternatively, in Block S158, the receiver module can execute methods and techniques described above to generate the second message including a command (or signal) to transition the source device from a first operating mode to a second operating mode in response to: the first bit error rate exceeding the bit error rate threshold for the first data stream; the first confidence level falling below the confidence level threshold for the first data stream; and/or the residual bit error rate falling below the residual bit error rate threshold for the first data stream.

The receiver module can transmit the second message to the source device in Block S160. More specifically, the receiver module (i.e., the second communication module) can transmit the second message to the source device via the transmitter module (i.e., the first communication module).

Additionally, in response to receiving subsequent diagnostic messages from the transmitter module, the receiver module can issue a command to the destination device (or source device) to transition from the second operating mode (e.g., a degraded operating mode, a safe state) to the first operating mode (e.g., a fully functional operating mode) in response to: a second bit error rate falling below the bit error rate threshold for the first data stream (e.g., a second bit error rate threshold corresponding to the second operating mode); a second confidence level exceeding the confidence level threshold for the first data stream (e.g., a second confidence level threshold corresponding to the second operating mode); and a second residual bit error rate falling below the residual bit error rate threshold for the first data stream (a second residual bit error rate threshold corresponding to the second operating mode).

7.3 Diagnostic Message Frequency

Generally, the transmitter module and the receiver module can cooperate to increase diagnostic message frequency in response to the confidence level of the bit error rate falling below a confidence level threshold for a data stream.

In one implementation, in response to the first confidence level falling below the confidence level threshold for the first data stream, the receiver module can transmit a signal (e.g., a message) to the transmitter module representing a command to define a third frequency—exceeding the second frequency—at which to generate and transmit a diagnostic message.

In this implementation, in response to receiving the signal from the receiver module, the transmitter module can: define the third frequency; and define a second set of diagnostic messages (e.g., a second subset of messages in a second set of messages) to be generated by the transmitter module and transmitted to the receiver module, each message in the second set of diagnostic messages generated and transmitted at the third frequency (e.g., during a second time period succeeding the first time period).

For example, the transmitter module can: define the first frequency, corresponding to 60 messages per second, at which to generate and transmit the second set of messages;

define the third frequency, corresponding to 20 messages per second, at which to generate the second set of diagnostic messages (i.e., the second subset of messages in the second set of messages); define the second set of messages (i.e., 60 messages), each message in the second set of messages generated and transmitted at the first frequency during a second time period exhibiting a duration of one second; and define the second set of diagnostic messages (i.e., twenty messages), each message in the second set of diagnostic messages generated and transmitted at the third frequency during the first time period exhibiting the duration of one second. In this example, during the second time period, the transmitter module generates and transmits the second set of messages exhibiting a third quantity of 60 messages, the second set of messages including the second set of diagnostic messages exhibiting a fourth quantity of twenty messages. More specifically, during the second time period, the transmitter module generates and transmits the second set of messages, every third message in the second set of messages characterized by a diagnostic message and including a set of reference data.

The transmitter module can execute methods and techniques described above to: access a second set of data in the first data stream; generate a third set of reference data based on the seed value; generating a third message in the second set of diagnostic messages, the third message including the second set of data and the third set of reference data; and transmit the third message to the receiver module via the first communication link.

The receiver module can execute methods and techniques described above to: receive the second message from the transmitter module via the first communication link; generate a fourth set of reference data based on the deterministic function and the seed value; extract the third set of reference data from the third message; define a second window of messages—exhibiting a quantity of message based on the third frequency—including the first message and the third message; define a second total quantity of reference data within the second window of messages; and calculate a second quantity of bit errors in the third set of reference data based on the fourth set of reference data. The receiver module can: calculate a second total quantity of bit errors in the second total quantity of reference data within the second window of messages based on the second quantity of bit errors; and calculate a second bit error rate of the first communication link based on the second total quantity of errors. Additionally, the receiver module can: calculate a second confidence level of the second bit error rate based on the first bit error rate threshold, the second total quantity of bit errors, and the second total quantity of reference data within the second window of messages; in response to the second confidence level exceeding the first confidence threshold for the first data stream, generate a fourth message including a second command to transition the second device from the second operating mode to the first operating mode; and transmit the fourth message to the destination device (and/or source device).

Accordingly, the system can accelerate a quantity of reference bits transmitted via the first communication link in response to a confidence level of detected bit error rate falling below a confidence level threshold, thereby enabling the system to establish—more rapidly—an updated confidence level of the detected bit error rate exceeding the confidence level threshold.

8. REDUNDANT CONTROLLERS

Figure 4A:
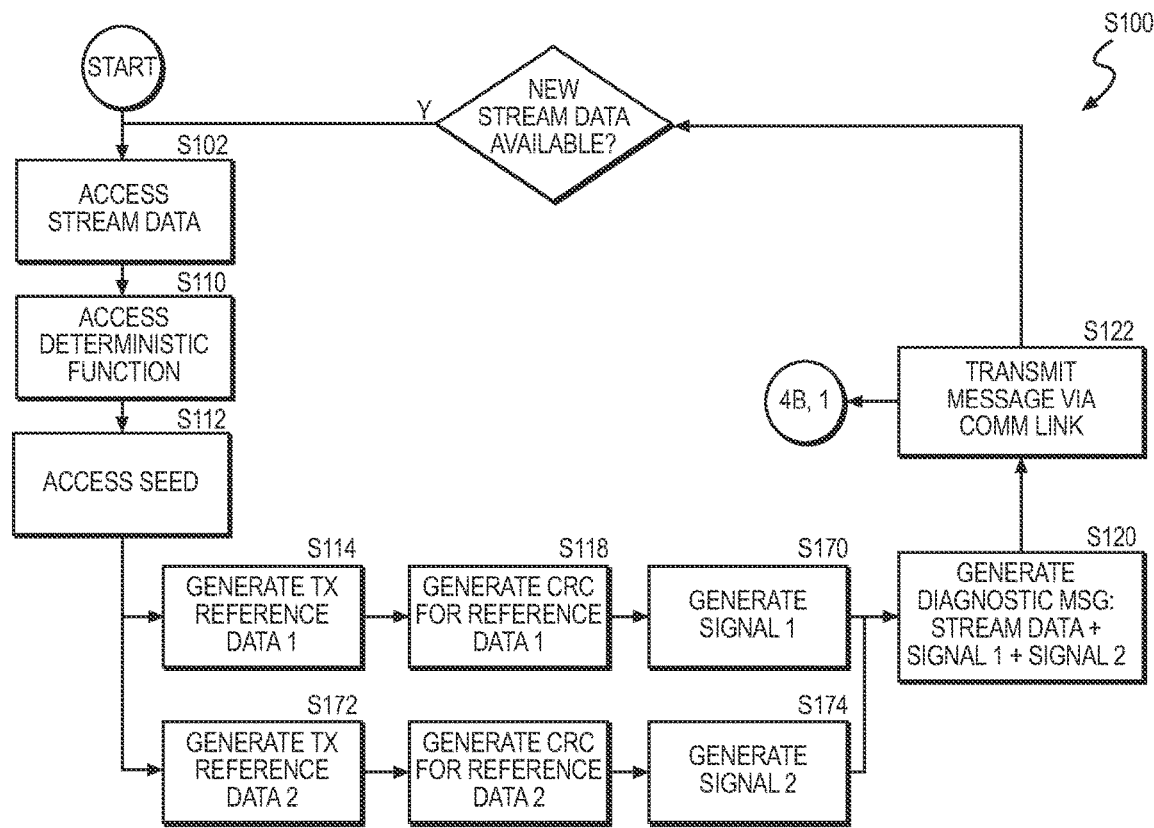
FIGS. 4A and 4B are flowchart representations of one variation of the method.
Figure 4B:
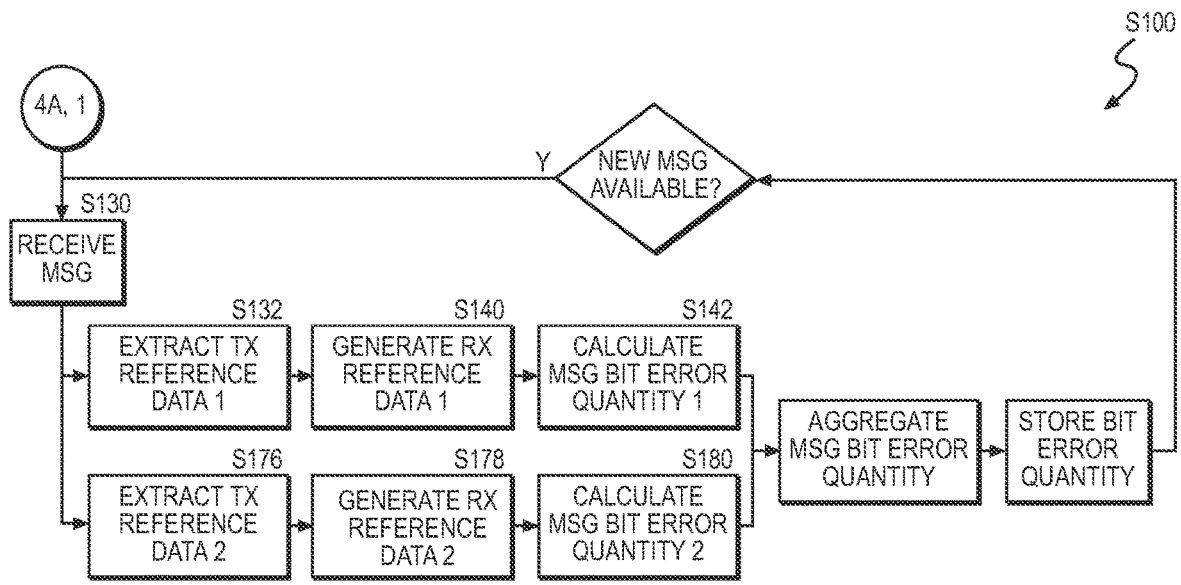

Generally, as shown in FIGS. 1, 4A, and 4B, each controller within the transmitter module can generate a distinct copy of the set of reference data, and each controller within the receiver module can validate a copy of the set of reference data.

In one implementation, in Block S114, the transmitter module can generate a first set of reference data based on the deterministic function and the seed value.

In another implementation, in Block S110, a first controller (e.g., a first safety controller) in the transmitter module can generate a first signal including (or representing) the first set of reference data. Additionally, the first controller can: generate a first error detecting value (e.g., a first CRC value, a first turbo code, a first Viterbi code) based on the first set of reference data; and generate the first signal including the first set of reference data and the first error detecting value.

In another implementation, a second controller (e.g., a second safety controller) in the transmitter module can: generate a third set of reference data based on the deterministic value and the seed function in Block S172; and generate a second signal including (or representing) the third set of reference data in Block S174. More specifically, the second controller can generate the third set of reference data representing a complement (or inverse) of the first set of reference data. Additionally, the first controller can: generate a second error detecting value (e.g., a second CRC value, a second turbo code, a second Viterbi code) based on the third set of reference data; and generate the second signal including the third set of reference data and the second error detecting value.

In one implementation, in Block S120, the transmitter module (e.g., a first application processor in the transmitter module) can generate the first message including: the first set of data in the first data stream; the first signal; and the second signal. Additionally, the third controller can: generate a third error detecting value (e.g., a cumulative CRC value, a cumulative turbo code, a cumulative Viterbi code) based on the first set of data in the first data stream, the first signal, and the second signal; and generate the first message including the first set of data in the first data stream, the first signal, the second signal, and the third error detecting value.

In this implementation, the transmitter module can transmit the first message to the receiver module via the first communication link in Block S122.

In one implementation, in response to receiving the first message from the transmitter module, the receiver module (e.g., a second application processor in the receiver module) can: validate the first message based on the third error detecting value; separate the first signal and the second signal from the first message; output the first signal to a third controller (e.g., a third safety controller) in the receiver module; and output the second signal to a fourth controller (e.g., a fourth safety controller) in the receiver module.

The transmitter module can generate a second set of reference data based on the deterministic function and the seed value in Block S140.

In another implementation, the third controller can: extract the first set of reference data from the first signal in the first message in Block S132; and calculate a first quantity of bit errors in the first set of reference data based on the second set of reference data in Block S142. Additionally, the third controller can validate the first signal based on the second error detecting value.

In another implementation, the fourth controller can: extract the third set of reference data from the second signal in the first message in Block S176; generate a fourth set of reference data representing a complement of the second set of reference data in Block S178; and calculate a second quantity of bit errors in the third set of reference data based on the fourth set of reference data in Block S180. Additionally, the fourth controller can validate the second signal based on the second error detecting value.

The transmitter module can then execute methods and techniques described above to calculate the first bit error rate of the first communication link based on the first quantity of bit errors and the second quantity of bit errors in Block S150.

Accordingly, the receiver module can execute redundant validation and diagnostics of a message, thereby ensuring a higher level of assurance of an accuracy of each validation process and corresponding bit error characterization.

9. MULTIPLE SOURCE DATA STREAMS

Generally, the system can execute methods and techniques described above to communicate multiple concurrent data streams via the first communication link and execute a distinct diagnostic procedure for each data stream.

In one implementation, the transmitter module can: access a second set of data in a second data stream (e.g., a data stream representing a battery level of the remotely operator forklift) from the source device; generate a third set of reference data based on a second deterministic function and a second seed value; generate a third message including the second set of data and the third set of reference data; and transmit the third message to the second communication module via the first communication link. More specifically, the transmitter module can generate the third set of reference data based on the bit rate of the second data stream and/or a second bit error rate threshold associated with the second data stream, the third set of reference data exhibiting a bit length based on the bit rate of the second data stream and/or the second bit error rate threshold associated with the second data stream.

In another implementation, the receiver module can: receive the third message from the first communication module via the first communication link; extract the third set of reference data from the third message; generate a fourth set of reference data based on the second deterministic function and the second seed value; calculate a second quantity of bit errors in the third set of reference data based on the fourth set of reference data; and calculate a second bit error rate of the first communication link based on the second quantity of errors. In response to the second bit error rate falling below the second bit error rate threshold (e.g., 0.1%) for the second data stream, the receiver module can: generate a fourth message representing a functional state of the first communication link for the second data stream; and transmit the fourth message to the destination device.

Accordingly, generating the third set of reference data exhibiting the bit length based on the bit rate of the second data stream and/or the second bit error rate threshold associated with the second data stream, the system module can thereby transmit a sufficient (e.g., statistically significant) quantity of reference bits to characterize the communication link—specific to requirements of the second data stream—and/or to calculate the second bit error rate (e.g., according to Equation 1 and/or Equation 2) at a resolution to fall below the second bit error rate threshold.

10. CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
   at a first communication module:
   accessing a first set of data in a first data stream from a first device;
   generating a first set of reference data based on a first deterministic function and a first seed value;
   generating a first message in a first set of diagnostic messages, each message in the first set of diagnostic messages generated at a first frequency during a first time period, the first message comprising the first set of data and the first set of reference data; and
   transmitting the first message to a second communication module via a first communication link; and
   at the second communication module:
   receiving the first message from the first communication module via the first communication link;
   extracting the first set of reference data from the first message;
   generating a second set of reference data based on the first deterministic function and the first seed value;
   calculating a first quantity of bit errors in the first set of reference data based on the second set of reference data;
   defining a total quantity of reference data within a first window of messages, comprising the first message, from the first communication module via the first communication link;
   based on the first quantity of bit errors, calculating a total quantity of bit errors in the total quantity of reference data within the first window of messages;
   calculating a first bit error rate of the first communication link based on the total quantity of bit errors and the total quantity of reference data within the first window of messages;
   calculating a first confidence level of the first bit error rate based on:
   a first bit error rate threshold;
   the total quantity of bit errors; and
   the total quantity of reference data within the first window of messages;
   generating a second message representing a fault and comprising a command to transition the first device from a first operating mode to a second operating mode in response to:

the first bit error rate exceeding the first bit error rate threshold for the first data stream; and
the first confidence level falling below a first confidence level threshold for the first data stream; and
transmitting the second message to a second device.

2. The method of claim 1, further comprising:
at the first communication module:
accessing a second set of data in the first data stream;
generating a third set of reference data based on the first deterministic function and the first seed value;
generating a third message comprising the second set of data and the third set of reference data; and
transmitting the third message to the second communication module via the first communication link; and
at the second communication module:
receiving the third message from the first communication module via the first communication link;
extracting the third set of reference data from the third message;
generating a fourth set of reference data based on the first deterministic function and the first seed value;
defining a second total quantity of reference data within a second window of messages, comprising the first message and the third message, from the first communication module via the first communication link;
calculating a second quantity of bit errors in the third set of reference data based on the fourth set of reference data;
based on the second quantity of bit errors, calculating a second total quantity of bit errors in the second total quantity of reference data within the second window of messages;
calculating a second bit error rate of the first communication link based on the second total quantity of errors;
in response to the second bit error rate falling below the first bit error rate threshold for the first data stream, generating a fourth message representing a functional state of the first communication link for the first data stream; and
transmitting the fourth message to the second device.

3. The method of claim 1:
further comprising calculating a first residual bit error rate of the first data stream based on the first bit error rate; and
wherein generating the second message comprises generating the second message representing the fault in response to:
the first bit error rate exceeding a first bit error rate threshold for the first data stream; and
the first residual bit error rate exceeding a first residual bit error rate threshold for the first data stream.

4. The method of claim 1:
further comprising:
at the first communication module, defining the first frequency based on a bit rate of the first data stream; and
at the second communication module, defining a quantity of messages in the first window of messages based on the first frequency.

5. The method of claim 1, further comprising:
at the first communication module:
in response to accessing the first set of data comprising a first identifier of the first data stream, accessing the first deterministic function based on the first identifier of the first data stream; and
accessing the first seed value comprising a second identifier of the second communication module; and
at the second communication module:
in response to receiving the first message, accessing the first deterministic function based on the first identifier of the first data stream; and
accessing the first seed value comprising the second identifier of the second communication module.

6. The method of claim 1:
wherein accessing the first set of data comprises accessing the first set of data comprising a first set of video data captured by a first optical sensor of the first device; and
further comprising:
classifying the first data stream into a first data class based on the first set of video data; and
accessing a first policy associated with the first data class, the first policy defining the first bit error rate threshold.

7. The method of claim 1:
wherein accessing the first set of data comprises accessing the first set of data comprising a first set of video data captured by a first optical sensor of the first device; and
wherein generating the second message comprises generating the second message comprising a command to transition the first device to a safe state.

8. The method of claim 1:
wherein generating the first message comprises:
at a first controller in the first communication module, generating a first signal comprising the first set of reference data;
at a second controller in the first communication module:
generating a third set of reference data representing a complement of the first set of reference data; and
generating a second signal comprising the third set of reference data; and
generating the first message comprising the first set of data, the first signal, and the second signal;
wherein extracting the first set of reference data comprises, at a third controller in the second communication module, extracting the first set of reference data from the first signal in the first message;
wherein calculating the first quantity of bit errors comprises, at the third controller, calculating the first quantity of bit errors in the first set of reference data based on the second set of reference data;
further comprising, at a fourth controller in the second communication module:
extracting the third set of reference data from the second signal in the first message;
generating a fourth set of reference data representing a complement of the second set of reference data; and
calculating a second quantity of bit errors in the third set of reference data based on the fourth set of reference data; and
wherein calculating the first bit error rate comprises calculating the first bit error rate of the first communication link based on the first quantity of bit errors and the second quantity of bit errors.

9. The method of claim 1, further comprising:
at the first communication module:
accessing a second set of data in a second data stream from the first device;
generating a third set of reference data based on a second deterministic function and a second seed value;

generating a third message comprising the second set of data and the third set of reference data; and
transmitting the third message to the second communication module via the first communication link; and
at the second communication module:
receiving the third message from the first communication module via the first communication link;
extracting the third set of reference data from the third message;
generating a fourth set of reference data based on the second deterministic function and the second seed value;
calculating a second quantity of bit errors in the third set of reference data based on the fourth set of reference data;
calculating a second bit error rate of the first communication link based on the second quantity of errors;
in response to the second bit error rate falling below a second bit error rate threshold for the second data stream, generating a fourth message representing a functional state of the first communication link for the second data stream; and
transmitting the fourth message to the second device.

10. The method of claim 1:
further comprising, by the first communication module:
generating a first error detecting value based on the first set of data in the first data stream; and
generating a second error detecting value based on the first set of reference data;
wherein generating the first message comprises generating the first message comprising:
the first set of data;
the first error detecting value;
the first set of reference data; and
the second error detecting value; and
further comprising, by the second communication module, validating the first set of reference data based on the second error detecting value.

11. The method of claim 1:
wherein generating the first set of reference data comprises generating the first set of reference data:
based on the first deterministic function and the first seed value; and
exhibiting a bit length based on a bit rate of the first data stream and the first bit error rate threshold.

12. A method comprising:
at a first communication module:
accessing a first set of data in a first data stream from a first device;
generating a first set of reference data based on a first deterministic function and a first seed value;
generating a first message in a first set of diagnostic messages, each message in the first set of diagnostic messages generated at a first frequency during a first time period, the first message comprising the first set of data and the first set of reference data; and
transmitting the first message to a second communication module via a first communication link; and
at the second communication module:
receiving the first message from the first communication module via the first communication link;
extracting the first set of reference data from the first message;
generating a second set of reference data based on the first deterministic function and the first seed value;
calculating a first quantity of bit errors in the first set of reference data based on the second set of reference data;
defining a total quantity of reference data within a first window of messages, comprising the first message, from the first communication module via the first communication link;
based on the first quantity of bit errors, calculating a total quantity of bit errors in the total quantity of reference data within the first window of messages;
calculating a first bit error rate of the first communication link based on the total quantity of bit errors and the total quantity of reference data within the first window set of messages;
calculating a first confidence level of the first bit error rate based on:
a first bit error rate threshold;
the total quantity of bit errors; and
the total quantity of reference data within the first window of messages;
in response to the first bit error rate falling below a first bit error rate threshold for the first data stream, and in response to the first confidence level falling below a first confidence level threshold for the first data stream, generating a second message comprising:
the first set of data;
the first bit error rate; and
a command to transition a second device from a first operating mode to a second operating mode; and
transmitting the second message to the second device.

13. The method of claim 12, further comprising:
at the first communication module:
accessing a second set of data in the first data stream;
generating a third set of reference data based on first deterministic function and the first seed value;
generating a third message comprising the second set of data and the third set of reference data; and
transmitting the third message to the second communication module via the first communication link; and
at the second communication module:
receiving the third message from the first communication module via the first communication link;
extracting the third set of reference data from the third message;
generating a fourth set of reference data based on the first deterministic function and the first seed value;
defining a second total quantity of reference data within a second window of messages, comprising the first message and the third message, from the first communication module via the first communication link;
calculating a second quantity of bit errors in the third set of reference data based on the fourth set of reference data;
based on the second quantity of bit errors, calculating a second total quantity of bit errors in the second total quantity of reference data within the second window of messages;
calculating a second bit error rate of the first communication link based on the second total quantity of errors;
in response to the second bit error rate exceeding the first bit error rate threshold for the first data stream, generating a fourth message representing a fault; and
transmitting the fourth message to the second device.

14. The method of claim 12, further comprising, in response to the first confidence level falling below a first confidence level threshold for the first data stream:
  at the first communication module:
    defining a second set of diagnostic messages from the first communication module to the second communication module via the first communication link, each message in the second subset of diagnostic messages generated at a second frequency, exceeding the first frequency, during a second time period succeeding the first time period;
    accessing a second set of data in the first data stream;
    generating a third set of reference data based on the first seed value; and
    generating a third message in the second set of diagnostic messages, the third message comprising the second set of data and the third set of reference data; and
  at the second communication module
    receiving the third message from the first communication module via the first communication link;
    extracting the third set of reference data from the third message;
    generating a fourth set of reference data based on the first seed value;
    defining a second window of messages:
      from the first communication module via the first communication link;
      comprising the first message and the third message; and
      exhibiting a quantity of messages based on the second frequency;
    defining a second total quantity of reference data within the second window of messages;
    calculating a second quantity of bit errors in the third set of reference data based on the fourth set of reference data;
    based on the second quantity of bit errors, calculating a second total quantity of bit errors in the second total quantity of reference data within the second window of messages;
    calculating a second bit error rate of the first communication link based on the second total quantity of errors;
    calculating a second confidence level of the second bit error rate based on:
      the first bit error rate threshold;
      the second total quantity of bit errors; and
      the second total quantity of reference data within the second window of messages;
    in response to the second confidence level exceeding the first confidence threshold for the first data stream, generating a fourth message comprising a second command to transition the second device from the second operating mode to the first operating mode; and
    transmitting the fourth message to the second device.

15. A method comprising:
  at a first communication module:
    accessing a first set of data in a first data stream from a first device;
    generating a first set of reference data based on a first deterministic function and a first seed value;
    generating a first message in a first set of diagnostic messages, each message in the first set of diagnostic messages generated at a first frequency during a first time period, the first message comprising the first set of data and the first set of reference data; and
    transmitting the first message to a second communication module via a first communication link; and
  at the second communication module:
    receiving the first message from the first communication module via the first communication link;
    extracting the first set of reference data from the first message;
    generating a second set of reference data based on the first deterministic function and the first seed value;
    calculating a first quantity of bit errors in the first set of reference data based on the second set of reference data;
    defining a total quantity of reference data within a first window of messages, comprising the first message, from the first communication module via the first communication link;
    based on the first quantity of bit errors, calculating a total quantity of bit errors in the total quantity of reference data within the first window of messages;
    calculating a first bit error rate of the first communication link based on the total quantity of bit errors and the total quantity of reference data within the first window of messages;
    calculating a first confidence level of the first bit error rate based on:
      a first bit error rate threshold;
      the total quantity of bit errors; and
      the total quantity of reference data within the first window of messages;
    in response to the first bit error rate exceeding a first bit error rate threshold for the first data stream, generating a second message representing a fault; and
    transmitting the second message to a second device; and
  in response to the first confidence level falling below a first confidence level threshold for the first data stream:
    defining a second set of diagnostic messages from the first communication module to the second communication module via the first communication link, each message in the second set of diagnostic messages generated at a second frequency, exceeding the first frequency, during a second time period succeeding the first time period;
    accessing a second set of data in the first data stream;
    generating a third set of reference data based on the first seed value;
    generating a third message in the second set of diagnostic messages, the third message comprising the second set of data and the third set of reference data; and
    transmitting the third message to the second communication module via the first communication link.

* * * * *